United States Patent
Dal Farra et al.

(10) Patent No.: US 6,178,162 B1
(45) Date of Patent: Jan. 23, 2001

(54) METHOD AND APPARATUS FOR INHIBITING ECHO IN A CHANNEL OF A COMMUNICATION SYSTEM

(75) Inventors: David Dal Farra, Nepean; Heping Ding, Kanata, both of (CA)

(73) Assignee: Nortel Networks Corporation, Montreal (CA)

(*) Notice: Under 35 U.S.C. 154(b), the term of this patent shall be extended for 0 days.

(21) Appl. No.: 08/994,456

(22) Filed: Dec. 19, 1997

(51) Int. Cl.[7] ............................. H04B 3/20; H04M 1/00
(52) U.S. Cl. ............................. 370/286; 379/410
(58) Field of Search .................... 370/286, 287, 370/288; 379/406, 407, 410, 411, 390

(56) References Cited

U.S. PATENT DOCUMENTS

| | | | |
|---|---|---|---|
| 4,852,161 | * 7/1989 | Hagiwara | 379/410 |
| 4,984,265 | * 1/1991 | Connan et al. | 379/390 |
| 5,343,521 | * 8/1994 | Jullien et al. | 379/410 |
| 5,539,731 | * 7/1996 | Haneda et al. | 379/410 |
| 5,612,996 | * 3/1997 | Li | 379/390 |
| 5,644,635 | * 7/1997 | Armbruster | 379/406 |
| 5,668,794 | * 9/1997 | McCaslin et al. | 370/288 |
| 6,009,083 | * 12/1999 | Flanagan et al. | 370/287 |
| 6,052,462 | * 4/2000 | Lu | 379/410 |

* cited by examiner

Primary Examiner—Chau Nguyen
Assistant Examiner—Phuongchau Ba Nguyen

(57) ABSTRACT

An improved echo canceller capable of reducing a magnitude of an echo signal propagating in a return channel of a communication device. The echo canceller includes an adaptive filter that models the echo path to generate an estimate of the echo. That estimate is subtracted from the echo-corrupted signal. The residual echo signal (error-signal) is then attenuated in a switching loss device. The switching loss device manifests a variable attenuation level selected in accordance with certain characteristics of the residual echo signal. These characteristics are the strength of the residual echo signal and its duration. For residual echo signals of very short duration, the attenuation level is set lower because those signals are perceived by the human ear as being weaker. For signals having a longer duration, the attenuation level is raised to inhibit the residual echo to acceptable levels.

24 Claims, 3 Drawing Sheets

METHOD AND APPARATUS FOR INHIBITING ECHO IN A CHANNEL OF A COMMUNICATION SYSTEM

FIELD OF THE INVENTION

The present invention relates to a method and a system for inhibiting echo in a communication line. The system is particularly useful for communication systems where an echo is susceptible to occur as a result of an acoustic feedback taking place at one end of the communication link (acoustical echo) or as a result of hybrid converters in the telecommunication network electrical echo).

BACKGROUND OF THE INVENTION

In a typical telephone network, two types of echoes may be present: acoustical echo and electrical echo. Acoustical echo is susceptible to occur for example in a telecommunication network when a hands-free telephone terminal is used. The speech signal generated from the speaker in the terminal will be fed back toward the microphone of the terminal for example acoustically or mechanically. This signal will be transmitted back to the talker and therefore creates echo.

Electrical echo results from the presence of an impedance mismatch, such as a hybrid converter that is required to connect a full duplex four wire link to a two wire loop. Hybrids may be found, for example in telephones with two-wire analog interfaces or in network (PSTN) line cards. Due to an impedance mismatch in the hybrid converter, part of the received energy is reflected back to the transmitting port. Consequently, a talker hears his own delayed speech that, of course, is undesirable.

The traditional approach for reduction of echo in communication networks is to use echo suppressors. A typical echo suppress or acts like a switch that monitors the voice signals travelling in both directions. It detects which person is talking and blocks the signal ID travelling in the opposite direction. The drawback of such echo suppressors is that they tend to "chop" speech signals when the subscribers talk back and forth quickly due to the response time for monitoring the speech activities. Moreover, during double talk, i.e., when the subscribers talk simultaneously, the suppressor fails to control the echo.

One possibility to avoid the problems of echo suppressors is to provide circuitry or an algorithm that, instead of blocking speech signals in one direction in the communication link, cancels the echo by using an adaptive filter. In essence, an adaptive echo canceller synthesises the echo that is then subtracted from the composite signal (speech signal plus echo signal). A residual echo from this subtraction can still be at a noticeable level ii a practical echo cancelling system because the adaptive filter may not be able to model perfectly the true echo path as a result of time-varying echo path, insufficient filter length, non-linear effects, finite precision computations, etc. Consequently, a non-linear processor, such as a centre clipper (also called "switched loss device"), is often used with an echo canceller for further reduction of the residual echo. However, practical design of such devices may cause speech clipping or introduce clipping sounds that degrade the quality of the communication. Another difficulty arises as a result of the regulatory echo control targets established for existing echo cancellation devices. The targets are typically expressed as long-term averages, and may be overly conservative with quiet signals. A method is required that addresses the time varying speech levels found in practice.

Thus, there exists a need in the industry to provide an improved echo canceller, particularly well suited for use during a communication session involving at least one hands-free telephone terminal or a communication network comprising a hybrid converter.

OBJECTIVES AND SUMMARY OF THE INVENTION

An object of this invention is to provide an improved method and apparatus for performing echo cancellation.

Another object of the invention is to provide a method and apparatus for performing echo cancellation while allowing reducing the amount of switched loss necessary to maintain an acceptable echo control.

As embodied and broadly described herein, the invention provides an echo canceller for reducing the magnitude of an echo occurring in a return channel of a communication device, said echo canceller including:

first processing means for generating an echo estimate, said first processing means including a first input for receiving a signal that is a precursor of the echo in the return channel of the communication device;

second processing means in operative relationship with said first processing means, said second processing means being responsive to said echo estimate for conditioning a signal input in the return channel of the communication device to generate an output signal in which echo is inhibited, the output signal being a residual echo signal;

a signal attenuation device for receiving and attenuating either one of the residual echo signal and the signal that is a precursor of the echo in the return channel of the communication device, said signal attenuation device manifesting a variable signal attenuation rate.

For the purposes of this specification, the expression "switched loss device" designates a system designed to limit or attenuate a signal in a non-linear manner. The switched loss device is not necessarily a component installed at a single location but it can be constituted by a distributed system including a series of components installed at various locations permitting to effect signal attenuation over one or more separate signals, namely the residual echo signal and the signal precursor of the echo signal.

In a most preferred embodiment of this invention, the switched loss device measures the power of the residual echo signal to determine the amount of attenuation to be effected by the signal attenuation device necessary to reduce the echo to acceptable levels. ost preferably, the signal attenuation device is a witched loss device that can be implemented by a multiplier, multiplying the signal by a value less than one to create loss. If the residual echo signal is weak, less switched loss is used. The amount of switched loss can also be made dependent upon the duration of the residual echo signal. This feature is based on the particular way the human ear perceives sounds. More specifically, when two noise-like signals of different duration but of equal energy level are presented to the ear at different times, and one is approximately less than 750 milliseconds in duration, the one shorter in duration will sound quieter. The echo canceller makes use of this characteristic and reduces the amount of switched loss applied to a residual echo signal when the residual echo has a duration less than approximately 750 milliseconds.

In a specific example, the echo canceller computes two distinct switched loss attenuation levels, one level being based on the power contained in the residual echo signal, the other taking into account the duration of the residual echo signal. After the computations are completed, the switched loss device is set at the lowest attenuation level. This feature allows maintaining an overall good echo cancellation when high levels of residual echo are present while avoiding the undesirable impairments arising from an unnecessary high switched loss when the level of residual echo is low.

As embodied and broadly described herein, the invention also provides a method for reducing a magnitude of an echo occurring in a return channel of a communication device, said method including the steps of:

a) generating an echo estimate, comprising the steps of:
  providing a first signal that is a precursor of the echo in the return channel of the communication system;
  processing said first signal to produce said echo estimate;
b) utilising said echo estimate for conditioning a signal propagating on the return channel of the communication device to generate an output signal in which echo is inhibited, the output signal being a residual echo signal;
c) attenuating either one the first signal and the residual echo signal in a switched loss device that manifests a variable signal attenuation rate.

As embodied and broadly described herein, the invention also provides an echo canceller for reducing the magnitude of an echo occurring in a return channel of a communication device, said echo canceller including:

first processing means for generating an echo estimate, said first processing means including a first input for receiving a signal that is a precursor of the echo in the return channel of the communication device;

second processing means in operative relationship with said first processing means, said second processing means being responsive to said echo estimate for conditioning a signal input in the return channel of the communication device to generate an output signal in which echo is inhibited, the output signal being a residual echo signal;

a signal attenuation device for receiving and attenuating either one of the residual echo signal and the signal that is a precursor of the echo in the return channel of the communication device, said switched loss device capable of manifesting a level of signal attenuation that varies at least in part in dependence upon a duration of the residual echo signal.

As embodied and broadly described herein, the invention also provides an echo canceller for reducing the magnitude of an echo occurring in a return channel of a communication device, said echo canceller including:

first processing means for generating an echo estimate, said first processing means including a first input tor receiving a signal that is a precursor of the echo in the return channel of the communication device;

second processing means in operative relationship with said first processing means, said second processing means being responsive to said echo estimate for conditioning a signal input in the return channel of the communication device to generate an output signal in which echo is inhibited, the output signal being a residual echo signal;

a signal attenuation device for receiving the signal that is a precursor of the echo in the return channel of the communication device, said signal attenuation device attenuating the signal that is a precursor of the echo in the return channel of the communication device at a level in selected in dependence upon a characteristic of the residual echo signal.

DESCRIPTION OF A PREFERRED EMBODIMENT

The present invention provides an improved echo canceller system that is particularly well suited for use in communications networks where an echo is susceptible to occur as a result of an acoustic feedback taking place at one end of the communication link (acoustical echo).

Figure 1:
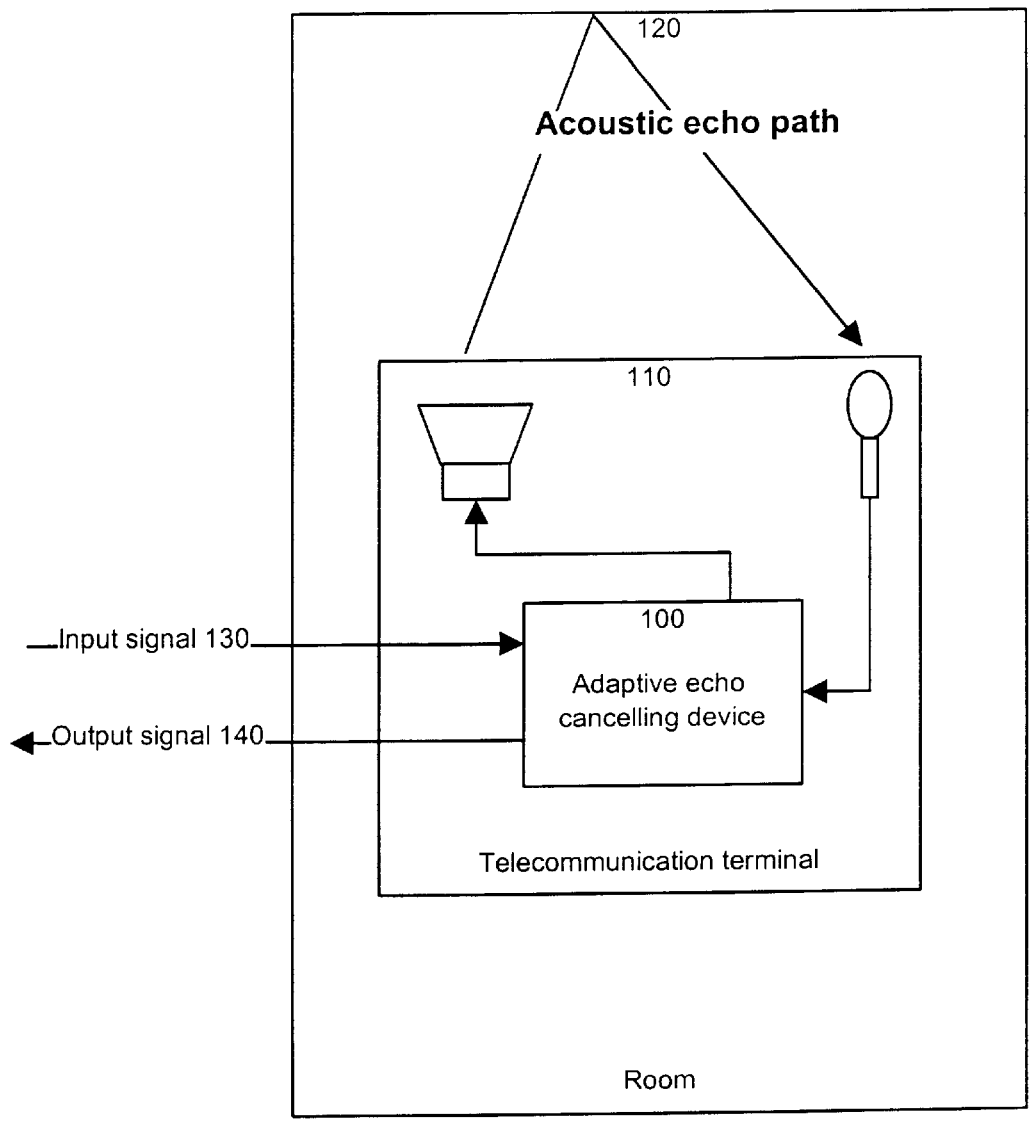
FIG. 1 is a block diagram of a hands-free telecommunication terminal featuring a novel echo canceller in accordance with the invention.

FIG. 1 illustrates a possible embodiment for the adaptive echo canceller 100. In this form of construction the adaptive echo canceller 100 is located within the telecommunication terminal 110. The telecommunication terminal 110 is placed in a room 120 were an acoustic echo path is present. The adaptive echo canceller 100 receives an input signal 130 from a far-end terminal. This signal 130 is also supplied to the loudspeaker output of the telecommunication terminal 110 in order that a user may hear the other party. The resulting sound wave that is generated by the loudspeaker will be picked up by microphone and fed back to the telecommunication terminal 110. The microphone sends the signal to the adaptive echo canceller 100 which removes as much of the echo as possible and sends an output signal 140 to the far end terminal. Ideally, this signal should be echo free as much as possible.

Figure 2:
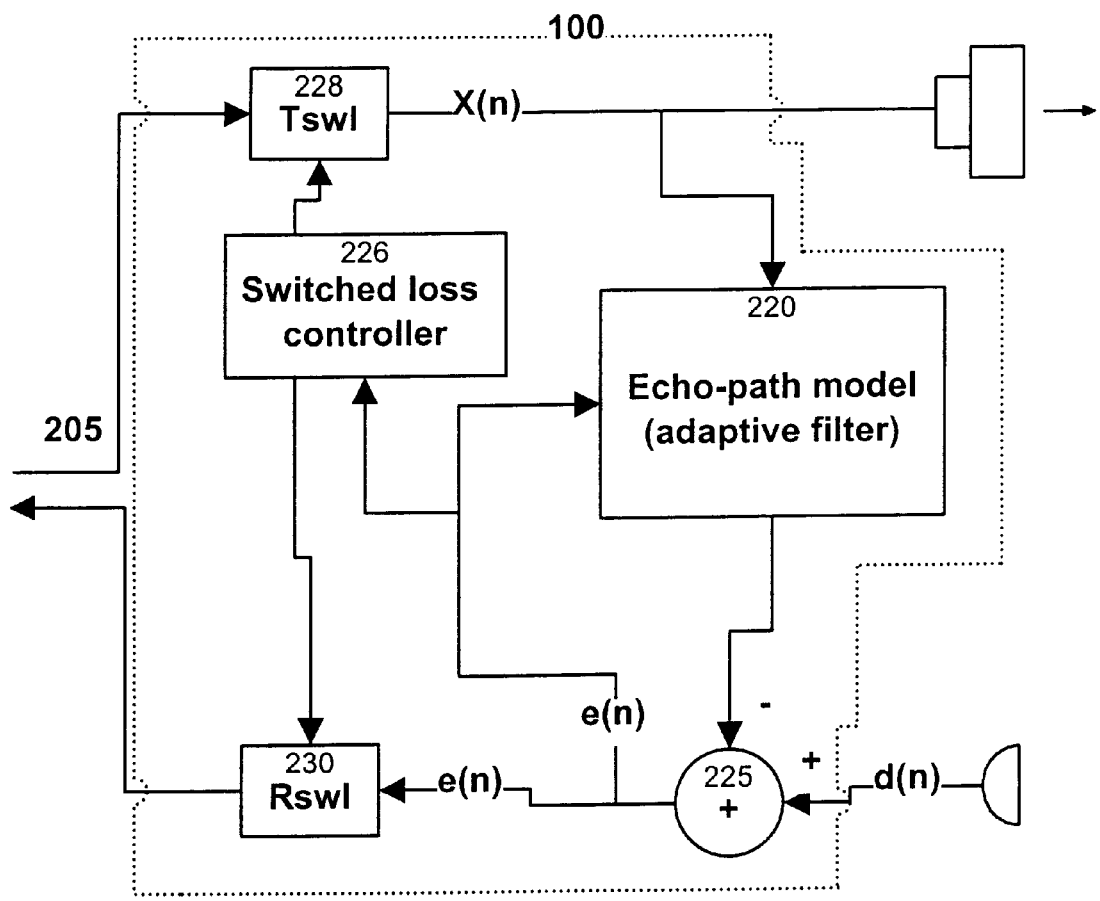
FIG. 2 is a block diagram of the echo canceller depicted at FIG. 1.

FIG. 2 shows a block diagram of the adaptive echo canceller 100 from FIG. 1. The adaptive echo canceller comprises an adaptive filter 220 and an adder 225. In this figure, the input 205 from the far-end terminal is the discrete-time signal used to drive the loudspeaker in FIGS. 1a and 1b and is the reference signal that is used by the adaptive filter. This signal is denoted x(n). A second input denoted d(n) is the signal picked up by the microphone in the room 120 as depicted in FIGS. 1a and 1b. The signal d(n) contains a portion of x(n) in the form of echo, background noise, and possibly, local signal such as speech or noise.

The adaptive filter 220, whose coefficient vector is $H_{n-1}$, is excited by x(n) to produce a replica of the echo signal. The residual echo signal e(n) (error signal) is then obtained by subtracting this replica of the echo signal from the signal d(n) and can be expressed as follows:

$$e(n) = d(n) - H_{n-1}^T X_n$$

where $X_n = [x(n), x(n-1), \ldots, x(n-(L-1))]^T$ and L is the length or order of the adaptive filter.

Figure 3:
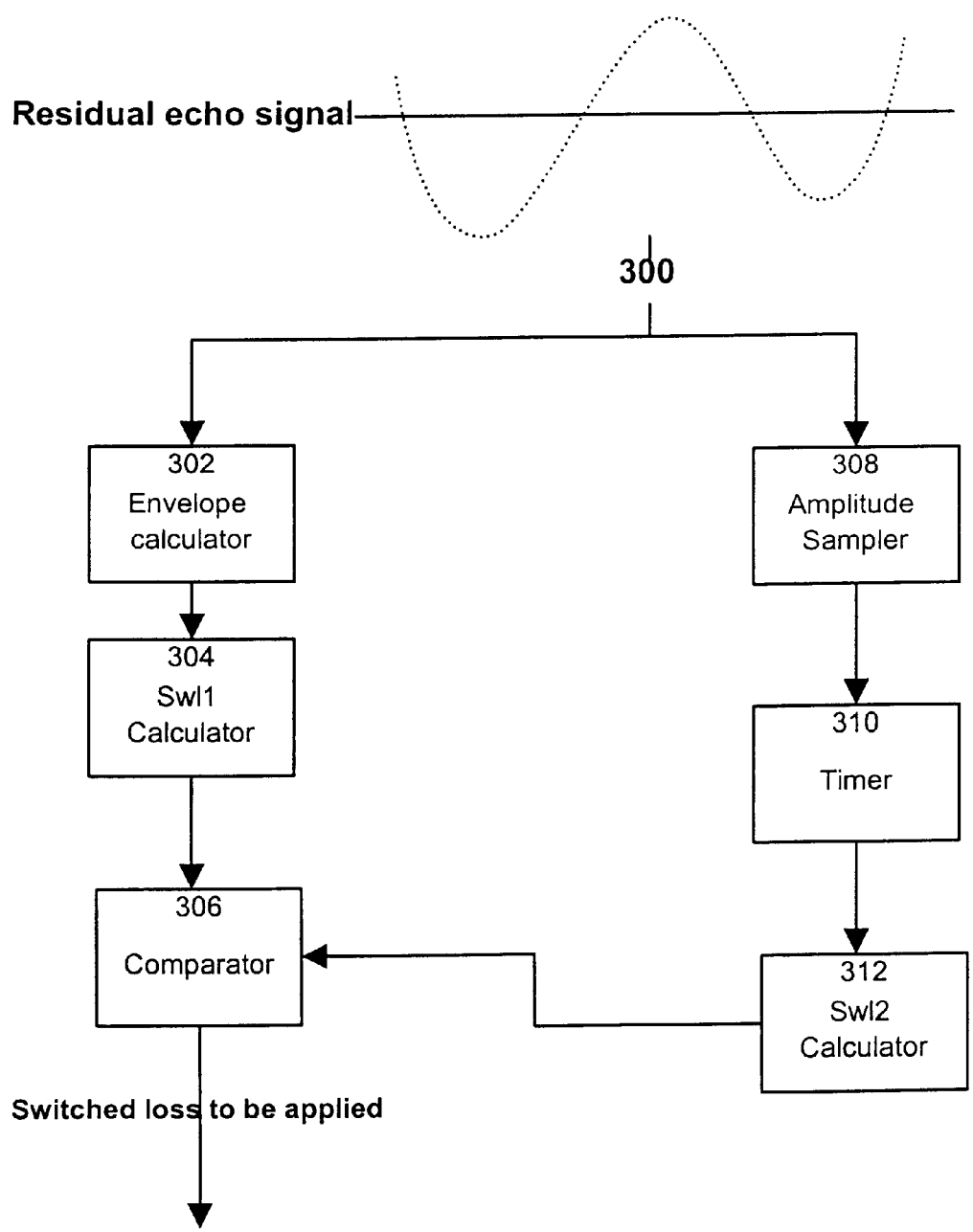
FIG. 3 is a block diagram of the switched loss controller depicted in FIG. 2.

The echo canceller 100 also comprises a pair of switched loss processors and a switched loss controller. A switched loss processor 228 is located in the transmit channel of the communication system, the one that conveys the signal that is a precursor of the echo. A switched loss processor 230 is placed in the return channel of the communication system and receives the residual echo signal e(n). The switched loss controller 226 is designed to regulate the level of attenuation of the switched loss processors 228 and 230. The switched loss processors 228 and 230 can be implemented by simple multipliers that multiply the audio stream by a value less than one so as to create loss. For instance, multiplying by 0.5 is the same as 6 dB loss (20 log(0.5)–6 dB). The switched loss controller has an input receiving the residual echo signal and two outputs, one per switched loss processor, to dispatch to each processor instructions on the level of attenuation to the implemented. The structure of the switched loss controller is depicted in greater detail in FIG. 3.

The switched loss controller includes an input 300 that receives the residual echo signal. An envelope calculator 302 receives that signal and generates an envelope (signal amplitude) estimate of the residual echo. Such an estimate may be obtained by using any suitable algorithm. It is not deemed necessary to describe such algorithms here because they are well known to those skilled in the art.

The following description of the operation of the system assumes that the system is operating only on pure echo signal, not a signal corrupted by near end speech or noise. In other words, no speech signal is being input in the microphone, except the signal causing the echo.

The envelope level value is passed to a first switch loss calculator that computes an interim value $Swl_1$ for the total switched loss required. This is effected by using the following relation:

$Swl_1$=the minimum of (0 dB, the envelope estimate−threshold), $Swl_1$ being greater or equal to 0 dB.

The threshold is the maximum transmitted echo level allowable. In a most preferred embodiment, the threshold has a value in a range from about −40 dBV to about −60 dBV.

The second step of the process is to compute a second interim switched loss value $Swl_2$. This is effected by the following procedure. The digitized signal on the input of 300 is supplied to an amplitude sampler 308 that calculates for each 4 milliseconds of the signal its rectified amplitude average that is expressed as dBV (140, FIG. 1*a*). This data is then passed to a timer 310 that computes for how long the signal is above the selected thresholds value discussed earlier. More specifically, the timer is designed to count real time every time the amplitude average of 4 milliseconds is greater than the threshold. Thus, as long as the 4 milliseconds amplitude averages are greater than the threshold the timer keeps counting. If the total accumulated time exceeds 750 milliseconds, the timer is stopped at that value and it is not allowed to increase the count further. The timer is automatically halted if a 4 millisecond average is below the threshold. The timer continues on again if no more than five consecutive 4 millisecond averages are below the threshold. If the total duration of the interruption exceeds 20 milliseconds or the equivalent of five consecutive 4 milliseconds averages, the timer is reset to zero and the value of 0 dB is assigned to the second interim value for the switched loss $Swl_2$.

The second interim value for the switched loss $Swl_2$ is computed every 4 ms by the calculation functional block 312 by using the following relation:

$Swl_2$ is the minimum of (0 dB, rectified amplitude average for the current 4 milliseconds sample−threshold−23+8*log(T)), where T is the accumulated time by the timer 310 in ms. $Swl_2$ is greater or equal to 0 dB.

The two interim switched loss values computed above are then passed to a comparator 306 that selects the value which is the lowest. The selected value represents the total switched loss to be enforced that is the sum of the switched loss at the processor 228 and the switched loss at the processor 230.

A number of observations should be made in connection with the above discussions that will help illustrate how the various factors influence the setting of the switched loss processors 228 and 230. For residual echo signals that are of long duration, say a duration exceeding 750 milliseconds, the second interim switched loss value ($Swl_2$) will be high because the element 8*log(T) is large. If that residual echo signal is relatively weak, then $Swl_1$ and $Swl_2$ will be nearly equivalent. The first interim switched loss value depends primarily on an envelope level estimate of the residual echo signal. If the envelope level estimate is below the threshold then the total switched loss value should be of 0 dB, in other words no attenuation. In cases where the residual echo signal is shorter, the two interim switched loss values start competing against each other. For residual signals of short duration, the second interim switched loss value could be predominant, (lower) particularly, if the signal is comparatively strong.

In short, the computation of the two switched loss interim values establishes a mechanism allowing to adjust the setting of the switched loss processors 228 and 230 dynamically in dependence of the power and duration of the residual echo signal so as to avoid the overly conservative switched loss settings in prior art echo cancellers with weak input signals (at 130, FIG. 1).

In a specific embodiment, the level of signal attenuation could be equally distributed between the two switched loss processors 228 and 230. More specifically, the switched loss processor 228 on the transmitter side will attenuate the received signal for, in turn, causing less echo generation. At the same time, the switched loss processor 230 attenuates at the same rate the residual echo signal. It should be noted that other possibilities exist and the total switched loss allocation between the two processors may be other than the example given here.

The system described above can be implemented by using any suitable digital signal processing technique as presently known or prospectively known to those skilled in the art. Such implementation would require a suitable computing platform and software to process the various signals in accordance with the strategies described above. Such computing platforms normally include a CPU and a memory for storage of data and of instructions to be executed by the CPU during the signal processing operations. The various implementation and details necessary to realize a physical device embodying the principles of the invention do not need to be described here because they would be readily apparent to those skilled in the art.

The above description of the invention should not be interpreted in any limiting manner since variations and refinements of the preferred embodiment are possible without departing from the spirit of the invention. The scope of the invention is defined in the appended claims and their equivalents.

What is claimed is:

1. An echo canceller for reducing the magnitude of an echo occurring in a return channel of a communication device, said echo canceller including:

a first processing unit for generating an echo estimate, said first processing unit including a first input for receiving a signal that is a precursor of the echo in the return channel of the communication device;

a second processing unit in operative relationship with said first processing unit, said second processing unit being responsive to said echo estimate for conditioning a signal input in the return channel of the communication device to generate an output signal in which echo is inhibited, the output signal being a residual echo signal;

a signal attenuation device for receiving and attenuating either one of the residual echo signal and the signal that is a precursor of the echo in the return channel of the communication device, said signal attenuation device operative to compute a first interim attenuation value at least partly on a basis of a strength of the residual echo signal and a second interim attenuation value at least partly on a basis of a duration of the residual echo signal, said signal attenuation device being operative to process the first and second interim attenuation values to determine a total level of signal attenuation, said signal attenuation device being operative to attenuate either one of the residual echo signal and the signal that is a precursor of the echo in the return channel of the communication device on the basis of the total level of signal attenuation.

2. An echo canceller as defined in claim 1, wherein said signal attenuation device is a switched loss device.

3. An echo canceller as defined in claim 2, wherein said switched loss device manifests a variable signal attenuation rate.

4. An echo canceller as defined in claim 3, wherein said switched loss device includes a switched loss controller and a first switched loss processor, said first switched loss processor receiving the residual echo signal to attenuate the residual echo signal.

5. An echo canceller as defined in claim 4, wherein said switched loss controller includes an input for receiving the residual echo signal for determining a level of signal attenuation to be implemented by said first switched loss processor, said switched loss controller including an output for transmitting data to said first switched loss processor indicative of a level of signal attenuation to be implemented by said first switched loss processor.

6. An echo canceller as defined in claim 5, wherein said switched loss device includes a second switched loss processor receiving the signal that is a precursor of the echo in the return channel of the communication device to attenuate the signal that is a precursor of the echo in the return channel of the communication device.

7. An echo canceller as defined in claim 6, wherein said switched loss controller is operative to compute said first and second interim attenuation values.

8. An echo canceller as defined in claim 7, further comprising a comparator receiving said first and second interim attenuation values for selecting either one of said first and second interim attenuation values, the selected interim attenuation value being representative of the total level of signal attenuation to be implemented by said first and second switched loss processors.

9. An echo canceller as defined in claim 8, wherein said comparator selects amongst said first and second interim attenuation values the value indicative of the lowest level of signal attenuation.

10. An echo canceller as defined in claim 9, wherein said switched loss controller includes an envelope calculator unit for determining an envelope estimate of the residual echo signal, said switched loss controller computing said first interim attenuation value at least partly on a basis of the envelop estimate of the residual echo signal.

11. An echo canceller as defined in claim 10, wherein said switched loss controller includes an amplitude sampler unit for determining an average amplitude of the residual echo signal, said switched loss controller computing said second interim attenuation value at least partly on a basis of the average amplitude of the residual echo signal.

12. An echo canceller as defined in claim 11, wherein the average amplitude is measured on a rectified residual echo signal.

13. An echo canceller as defined in claim 12, wherein said switched loss controller includes a timer to count real time.

14. An echo canceller as defined in claim 13, wherein said timer is stopped from counting when a time counted exceeds approximately 750 ms.

15. An echo canceller as defined in claim 13, wherein said counter is allowed to count when an amplitude of the rectified residual signal exceeds a certain threshold.

16. An echo canceller as defined in claim 14, wherein said timer is precluded from counting when an amplitude of the rectified residual signal is less than said certain threshold.

17. An echo canceller as defined in claim 15, wherein said timer is reset if an amplitude of the rectified residual signal is below said certain threshold for a predetermined length of time.

18. A method for reducing a magnitude of an echo occurring in a return channel of a communication device, said method including the steps of:

providing a first signal that is a precursor of the echo in the return channel of the communication system;

processing said first signal to produce said echo estimate;

utilising said echo estimate for conditioning a signal propagating on the return channel of the communication device to generate an output signal in which echo is inhibited, the output signal being a residual echo signal;

computing a first interim attenuation value at least partly on a basis of a strength of the residual echo signal and a second interim attenuation value at least partly on a basis of a duration of the residual echo signal;

processing the first and second interim attenuation values to determine a total level of signal attenuation;

attenuating either one of the first signal and the residual echo signal on a basis of the total level of signal attenuation.

19. A method as defined in claim 18, further comprising the step of comparing said first and second interim attenuation values for selecting either one of said first and second attenuation values, the selected interim attenuation value being representative of the total level of signal attenuation.

20. A method as defined in claim 19, comprising the step of selecting amongst the first and second interim attenuation values the value indicative of the lowest level of signal attenuation.

21. A method as defined in claim 20, comprising the step of determining an envelop estimate of the residual echo signal during a computation of the first interim attenuation value.

22. A method as defined in claim 21, comprising the step of determining an average amplitude of the residual echo signal during a computation of the second interim attenuation value.

23. A method as defined in claim 22, further comprising the step of counting real time during a computation of the second interim attenuation value.

24. An echo canceller for reducing the magnitude of an echo occurring in a return channel of a communication device, said echo canceller including:

first processing means for generating an echo estimate, said first processing means including a first input for receiving a signal that is a precursor of the echo in the return channel of the communication device;

second processing unit means in operative relationship with said first processing means, said second processing means being responsive to said echo estimate for conditioning a signal input in the return channel of the communication device to generate an output signal in which echo is inhibited, the output signa- being a residual echo signal;

signal attenuation means for receiving and attenuating either one of the residual echo signal and the signal that is a precursor of the echo in the return channel of the communication device, said signal attenuation means operative to compute a first interim attenuation value at least partly on a basis of a strength of the residual echo signal and a second interim attenuation value at least partly on a basis of a duration of the residual echo signal, said signal attenuation means being operative to process the first and second interim attenuation values to determine a total level of signal attenuation, said signal attenuation means being operative to attenuate either one of the residual echo signal and the signal that is a precursor of the echo in the return channel of the communication device on the basis of the total level of signal attenuation.

* * * * *